(12) United States Patent
Engle

(10) Patent No.: US 11,144,060 B2
(45) Date of Patent: Oct. 12, 2021

(54) ROAD QUALITY BASED ROUTING

(71) Applicant: GM CRUISE HOLDINGS LLC, San Francisco, CA (US)

(72) Inventor: Stephanie Olivia Engle, San Francisco, CA (US)

(73) Assignee: GM Cruise Holdings, LLC, San Francisco, CA (US)

( * ) Notice: Subject to any disclaimer, the term of this patent is extended or adjusted under 35 U.S.C. 154(b) by 164 days.

(21) Appl. No.: 16/589,080

(22) Filed: Sep. 30, 2019

(65) Prior Publication Data
US 2021/0096570 A1 Apr. 1, 2021

(51) Int. Cl.
| | |
|---|---|
| G05D 1/02 | (2020.01) |
| G05D 1/00 | (2006.01) |
| B60W 40/06 | (2012.01) |
| B60W 50/14 | (2020.01) |
| G01C 21/34 | (2006.01) |
| G07C 5/08 | (2006.01) |

(52) U.S. Cl.
CPC .......... *G05D 1/0214* (2013.01); *B60W 40/06* (2013.01); *B60W 50/14* (2013.01); *G01C 21/3461* (2013.01); *G05D 1/0088* (2013.01); *G05D 1/0276* (2013.01); *G07C 5/085* (2013.01); *B60W 2520/14* (2013.01); *B60W 2520/16* (2013.01); *B60W 2520/18* (2013.01); *B60W 2540/215* (2020.02); *B60W 2552/00* (2020.02); *B60W 2556/45* (2020.02)

(58) Field of Classification Search
CPC .. G05D 1/0214; G05D 1/0088; G05D 1/0276; B60W 40/06; B60W 50/14; B60W 2540/215; B60W 2552/00; B60W 2556/45; B60W 2520/18; B60W 2520/16; B60W 2520/14; G07C 5/085; G01C 21/3461
See application file for complete search history.

(56) References Cited

U.S. PATENT DOCUMENTS

| | | | | |
|---|---|---|---|---|
| 2014/0330526 A1* | 11/2014 | Allen | ............... | G01M 5/0025 702/34 |
| 2015/0094948 A1* | 4/2015 | Lu | ............... | B60G 17/018 701/410 |
| 2015/0183440 A1* | 7/2015 | Jackson | ............... | G07C 5/008 701/31.4 |
| 2015/0184348 A1* | 7/2015 | Stracke, Jr. | ............... | G01C 21/28 702/141 |
| 2016/0069693 A1* | 3/2016 | Wingrove | ............... | G01C 21/3484 701/468 |
| 2020/0255026 A1* | 8/2020 | Katardjiev | ............... | G08G 1/096725 |

FOREIGN PATENT DOCUMENTS

CN 102485875 A * 6/2012

* cited by examiner

*Primary Examiner* — Thomas Ingram
(74) *Attorney, Agent, or Firm* — Polsinelli, PC

(57) ABSTRACT

A non-transitory computer readable medium having instructions stored thereon that, when executed by at least one processor, cause the at least one processor to receive road quality data from at least one vehicle in a fleet of vehicles and determine a route for the at least one vehicle in the fleet of vehicles. The road quality data may be gathered by at least one sensor configured to detect autonomous vehicle movements and orientation. The route may avoid a segment of road that is associated with poor road quality data.

18 Claims, 4 Drawing Sheets

ROAD QUALITY BASED ROUTING

TECHNICAL FIELD

The present technology relates to recording road quality information and more particularly routing for vehicles based upon quality of roads.

BACKGROUND

An autonomous vehicle is a motorized vehicle that can navigate without a human driver. An exemplary autonomous vehicle includes a plurality of sensor systems, such as, but not limited to, a camera sensor system, a lidar sensor system, a radar sensor system, amongst others, wherein the autonomous vehicle operates based upon sensor signals output by the sensor systems. Specifically, the sensor signals are provided to an internal computing system in communication with the plurality of sensor systems, wherein a processor executes instructions based upon the sensor signals to control a mechanical system of the autonomous vehicle, such as a vehicle propulsion system, a braking system, or a steering system.

When a vehicle navigates roads, the vehicle will inevitably encounter a variety of different roads with a variety of different levels of road quality. Human drivers use their judgment to determine which roads to take based on a wide variety of factors. However, it is challenging for the autonomous vehicle to determine which roads to take, while minimizing damage to the autonomous vehicle.

BRIEF DESCRIPTION OF THE DRAWINGS

The above-recited and other advantages and features of the present technology will become apparent by reference to specific implementations illustrated in the appended drawings. A person of ordinary skill in the art will understand that these drawings only show some examples of the present technology and would not limit the scope of the present technology to these examples. Furthermore, the skilled artisan will appreciate the principles of the present technology as described and explained with additional specificity and detail through the use of the accompanying drawings in which.

DETAILED DESCRIPTION

Various examples of the present technology are discussed in detail below. While specific implementations are discussed, it should be understood that this is done for illustration purposes only. A person skilled in the relevant art will recognize that other components and configurations may be used without parting from the spirit and scope of the present technology. In some instances, well-known structures and devices are shown in block diagram form in order to facilitate describing one or more aspects. Further, it is to be understood that functionality that is described as being carried out by certain system components may be performed by more or fewer components than shown.

In general, a vehicle will traverse roads having a wide variety of different levels of road quality. Roads having a low road quality may cause damage to the vehicle and may also cause discomfort for passengers of the vehicle.

While human drivers can use their judgment to determine which roads to drive on, it is more challenging for an autonomous vehicle. Furthermore, human drivers may use their judgment to determine how quickly to drive on roads having low road quality to mitigate damage to the vehicle and minimize discomfort for the passengers of the vehicle. Not only is it challenging for the autonomous vehicle to determine which roads to drive on, but it is also challenging for the autonomous vehicle to navigate the roads at an efficient pace, especially on roads having low road quality. In other words, it is difficult for the autonomous vehicle to determine how quickly to drive through roads having low road quality, while also maintaining acceptable levels of damage to the autonomous vehicle and discomfort for the passenger of the autonomous vehicle. Thus, there is a need for routing vehicles based on road quality.

While the present technology is primarily discussed with respect to autonomous vehicles, it applies equally to any routing application (e.g., vehicle navigation apps, ride share services that provide routes to vehicles in a fleet, etc.) that can take into account road quality when routing vehicles.

Figure 1:
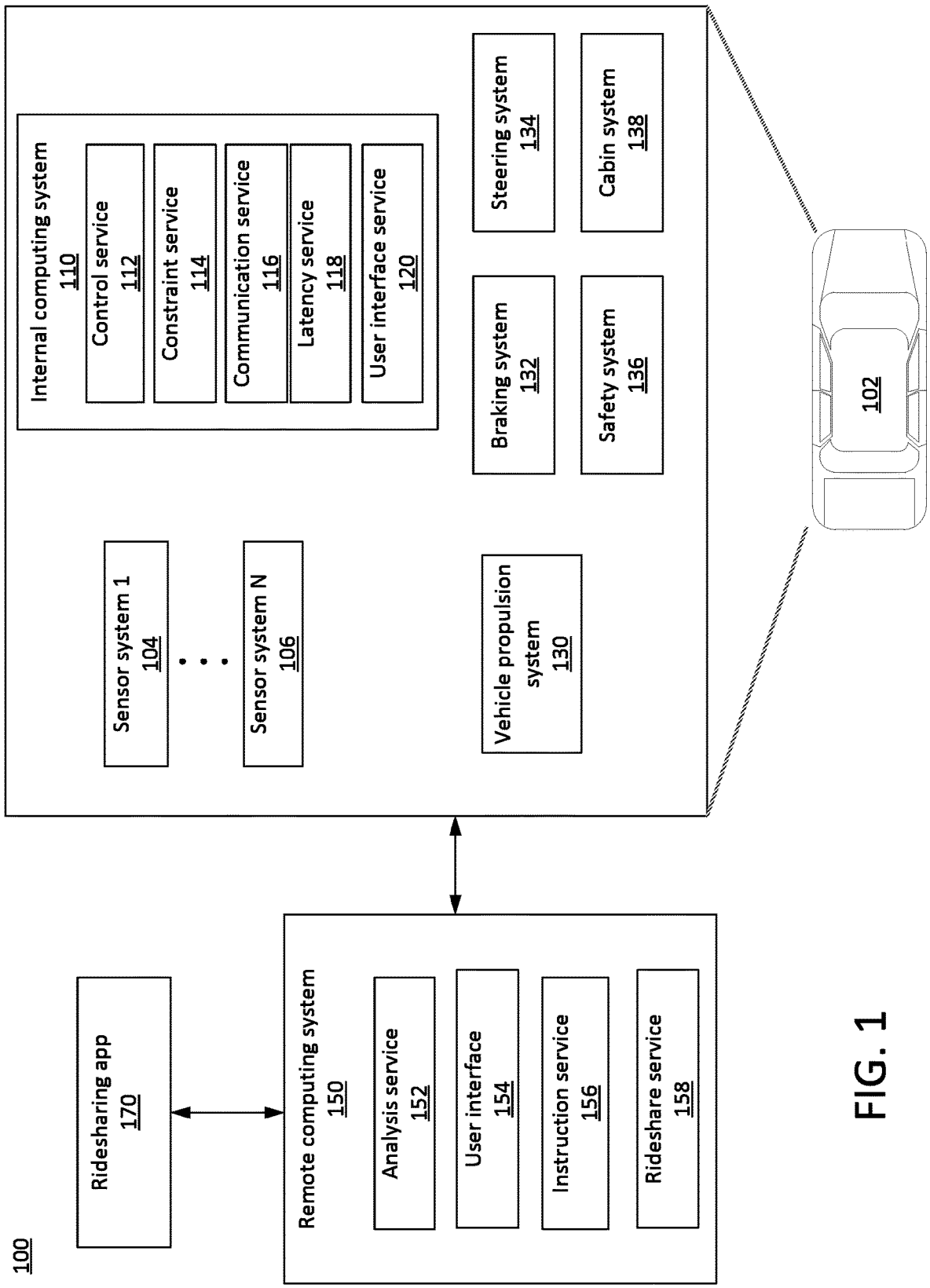
FIG. 1 shows an example of a content management system and client devices.

FIG. 1 illustrates environment 100 that includes an autonomous vehicle 102 in communication with a remote computing system 150.

The autonomous vehicle 102 can navigate about roadways without a human driver based upon sensor signals output by sensor systems 104-106 of the autonomous vehicle 102. The autonomous vehicle 102 includes a plurality of sensor systems 104-106 (a first sensor system 104 through an Nth sensor system 106). The sensor systems 104-106 are of different types and are arranged about the autonomous vehicle 102. For example, the first sensor system 104 may be a camera sensor system, and the Nth sensor system 106 may be a lidar sensor system. Other exemplary sensor systems include radar sensor systems, global positioning system (GPS) sensor systems, inertial measurement units (IMU), infrared sensor systems, laser sensor systems, sonar sensor systems, and the like. In some embodiments, the sensor systems 104-106 may include suspension sensors configured to monitor changes in movement and orientation of the autonomous vehicle, such as changes to roll, pitch, and yaw of the autonomous vehicle. In some embodiments, the sensor systems 104-106 may include weight sensors to determine a weight of an object or person on a given portion of the autonomous vehicle 102. For example, a weight sensor may be attached to a seat to determine a weight of a passenger. Similarly, a weight sensor may be disposed in the suspension system to determine a total weight of the autonomous vehicle 102 and the objects and passengers therein.

The autonomous vehicle 102 further includes several mechanical systems that are used to effectuate appropriate motion of the autonomous vehicle 102. For instance, the mechanical systems can include but are not limited to, a vehicle propulsion system 130, a braking system 132, and a steering system 134. The vehicle propulsion system 130 may include an electric motor, an internal combustion engine, or both. The braking system 132 can include an engine brake, brake pads, actuators, and/or any other suitable componentry that is configured to assist in decelerating the autonomous vehicle 102. The steering system 134 includes suitable componentry that is configured to control the direction of movement of the autonomous vehicle 102 during navigation.

The autonomous vehicle 102 further includes a safety system 136 that can include various lights and signal indicators, parking brake, airbags, etc. The autonomous vehicle 102 further includes a cabin system 138 that can include cabin temperature control systems, in-cabin entertainment systems, etc.

The autonomous vehicle 102 additionally comprises an internal computing system 110 that is in communication with the sensor systems 104-106 and the systems 130, 132, 134, 136, and 138. The internal computing system includes at least one processor and at least one memory having computer-executable instructions that are executed by the processor. The computer-executable instructions can make up one or more services responsible for controlling the autonomous vehicle 102, communicating with remote computing system 150, receiving inputs from passengers or human co-pilots, logging metrics regarding data collected by sensor systems 104-106 and human co-pilots, etc.

The internal computing system 110 can include a control service 112 that is configured to control the operation of the vehicle propulsion system 130, the braking system 108, the steering system 110, the safety system 136, and the cabin system 138. The control service 112 receives sensor signals from the sensor systems 104-106 as well communicates with other services of the internal computing system 110 to effectuate operation of the autonomous vehicle 102. In some embodiments, control service 112 may carry out operations in concert one or more other systems of autonomous vehicle 102.

The internal computing system 110 can also include a constraint service 114 to facilitate safe propulsion of the autonomous vehicle 102. The constraint service 116 includes instructions for activating a constraint based on a rule-based restriction upon operation of the autonomous vehicle 102. For example, the constraint may be a restriction upon navigation that is activated in accordance with protocols configured to avoid occupying the same space as other objects, abide by traffic laws, circumvent avoidance areas, etc. In some embodiments, the constraint service can be part of the control service 112.

The internal computing system 110 can also include a communication service 116. The communication service can include both software and hardware elements for transmitting and receiving signals from/to the remote computing system 150. The communication service 116 is configured to transmit information wirelessly over a network, for example, through an antenna array that provides personal cellular (long-term evolution (LTE), 3G, 5G, etc.) communication.

In some embodiments, one or more services of the internal computing system 110 are configured to send and receive communications to remote computing system 150 for such reasons as reporting data for training and evaluating machine learning algorithms, requesting assistance from remoting computing system or a human operator via remote computing system 150, software service updates, ridesharing pickup and drop off instructions etc.

The internal computing system 110 can also include a latency service 118. The latency service 118 can utilize timestamps on communications to and from the remote computing system 150 to determine if a communication has been received from the remote computing system 150 in time to be useful. For example, when a service of the internal computing system 110 requests feedback from remote computing system 150 on a time-sensitive process, the latency service 118 can determine if a response was timely received from remote computing system 150 as information can quickly become too stale to be actionable. When the latency service 118 determines that a response has not been received within a threshold, the latency service 118 can enable other systems of autonomous vehicle 102 or a passenger to make necessary decisions or to provide the needed feedback.

The internal computing system 110 can also include a user interface service 120 that can communicate with cabin system 138 in order to provide information or receive information to a human co-pilot or human passenger. In some embodiments, a human co-pilot or human passenger may be required to evaluate and override a constraint from constraint service 114, or the human co-pilot or human passenger may wish to provide an instruction to the autonomous vehicle 102 regarding destinations, requested routes, or other requested operations.

As described above, the remote computing system 150 is configured to send/receive a signal from the autonomous vehicle 140 regarding reporting data for training and evaluating machine learning algorithms, requesting assistance from remote computing system 150 or a human operator via the remote computing system 150, software service updates, rideshare pickup and drop off instructions, etc.

The remote computing system 150 includes an analysis service 152 that is configured to receive data from autonomous vehicle 102 (or a fleet of autonomous vehicles 102) and analyze the data to train or evaluate machine learning algorithms for operating the autonomous vehicle 102. For example, the analysis service 152 may receive data from sensor systems 104-106 of the autonomous vehicle 102 and analyze the data to train machine learning algorithms to determine potential damage associated with autonomous vehicles 102 traversing specific roads. The analysis service 152 can also perform analysis pertaining to data associated with one or more errors or constraints reported by autonomous vehicle 102.

The remote computing system 150 can also include a user interface service 154 configured to present metrics, video, pictures, sounds reported from the autonomous vehicle 102 to an operator of remote computing system 150. User interface service 154 can further receive input instructions from an operator that can be sent to the autonomous vehicle 102.

The remote computing system 150 can also include an instruction service 156 for sending instructions regarding the operation of the autonomous vehicle 102. For example, in response to an output of the analysis service 152 or user interface service 154, instructions service 156 can prepare instructions to one or more services of the autonomous vehicle 102 or a co-pilot or passenger of the autonomous vehicle 102.

The remote computing system 150 can also include a rideshare service 158 configured to interact with ridesharing application 170 operating on (potential) passenger computing devices. The rideshare service 158 can receive requests to be picked up or dropped off from passenger ridesharing app 170 and can dispatch autonomous vehicle 102 for the trip. The rideshare service 158 can also act as an intermediary between the ridesharing app 170 and the autonomous vehicle wherein a passenger might provide instructions to the autonomous vehicle to 102 go around an obstacle, change routes, honk the horn, etc.

As described herein, one aspect of the present technology is the gathering and use of data available from various sources to improve ride quality and a passenger experience. The present disclosure contemplates that in some instances, this gathered data may include personal information. The present disclosure contemplates that the entities involved with such personal information respect and value privacy policies and practices.

Figure 2:
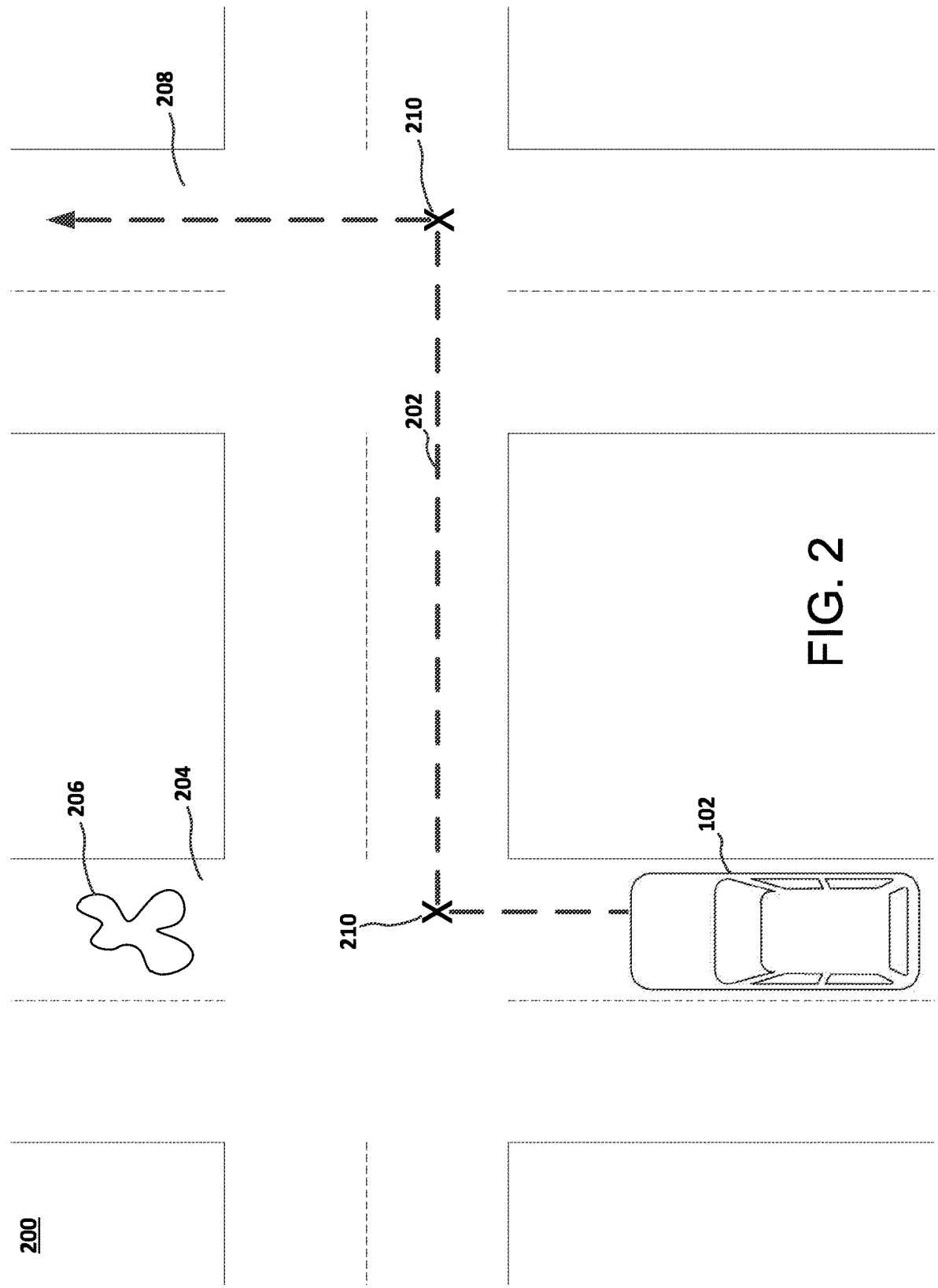
FIG. 2 shows an example environment of an autonomous vehicle navigating a route.

FIG. 2 shows an example scenario 200 of the autonomous vehicle 102 having a route 202 based on road quality. More specifically, the route 202 avoids a road 204 having a segment 206 associated with has poor road quality. Instead, the autonomous vehicle 102 is instructed to traverse the route 202 along a second road 208 having better road quality. More specifically, the route 202 may have a plurality of waypoints 210, to which the autonomous vehicle 102 is instructed to navigate. Road quality may be based upon a wide variety of different factors. For example, roads associated with poor road quality may have bumps, potholes, dips, sharp objects lying thereon, prone to flooding, etc. Roads associated with better road quality may be smoother, well-marked (i.e. lanes are easily detectable), straight, etc.

As passengers ride the autonomous vehicle 102 from a start location to a destination, the passengers may prefer to have the autonomous vehicle 102 take the second or smoother road 208, while some passengers may prefer to take the road 204 having poor road quality if the road 204 allows the autonomous vehicle 102 to arrive at a destination more quickly.

Figure 3:
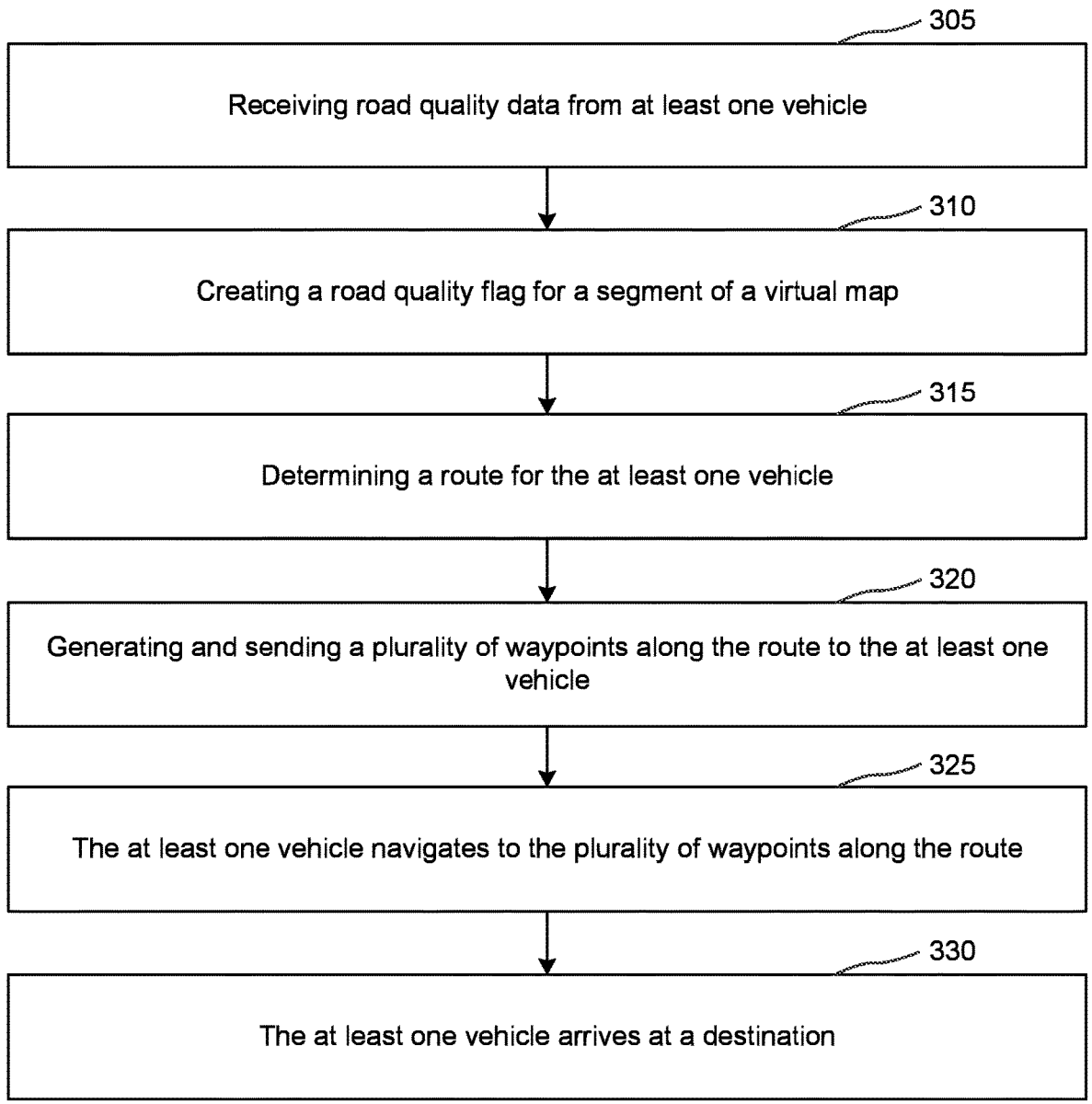
FIG. 3 is a flow diagram that illustrates a process for road quality based routing.

FIG. 3 shows a process 300 that may be utilized to determine the route 202 based on road quality. For explanatory purposes, the process 300 is described to be implemented by the remote computing system 150; however, it is to be understood that the process 300 may be implemented by a wide variety of different systems. For example, the internal computing system 110 of the autonomous vehicle 102 may also implement the process 300.

The process 300 begins at step 305 where the remote computing system 150 may receive road quality data from the autonomous vehicle 102. More specifically, the autonomous vehicle 102 may utilize the sensor systems 104-106 to determine road quality data. In some embodiments, the sensor systems 104-106 of the autonomous vehicle 102 may be configured to detect movements and an orientation of the autonomous vehicle 102. For example, the autonomous vehicle 102 may have a suspension sensor that is configured to determine and/or monitor roll, pitch, and/or yaw of the autonomous vehicle 102 while the autonomous vehicle 102 travels along a road. In some embodiments, the autonomous vehicle 102 may utilize the sensor systems 104-106 such as accelerometers, and gyroscopes to determine accelerations/decelerations from hitting potholes or rough road services or detecting changes in orientation of autonomous vehicle 102. In some embodiments, the autonomous vehicle 102 may utilize the sensor systems 104-106 as cameras, radars, sonar, LiDAR, etc. to determine the road quality of the road. For example, the autonomous vehicle 102 may generate LiDAR point cloud data of the surface of the road, and determine a road quality score based on the LiDAR point cloud data. The road quality score may be based on a statistical deviation of the actual surface of the road from a best fit flat or continuous curvature (i.e. a hypothetical high quality road). In one or more embodiments, the road quality data may be based on a portion of the road the autonomous vehicle 102 predicts the autonomous vehicle 102 will drive on or otherwise come into contact with. In some embodiments, the autonomous vehicle 102 may be in a fleet of autonomous vehicles and may communicate with other autonomous vehicles in the fleet of autonomous vehicles to determine road quality of other roads. For example, the autonomous vehicle 102 may locally store mapping data, as will be discussed in greater detail, that may indicate another autonomous vehicle had already determined a road quality data for a particular road.

At step 310, the remote computing system 150 creates a road quality flag for a segment of a virtual map that corresponds to the segment 206 of the road 204 that is associated with the poor road quality data. In some embodiments, the remote computing system 150 may store the road quality flags, the segments, and the virtual map in a map database. Thus, the remote computing system 150 may have access to historical road quality data in the virtual map.

At step 315, the remote computing system 150 determines the route 202 for the autonomous vehicle 102, which may be in a fleet of autonomous vehicles. In determining the route 202, the remote computing system 150 draws upon a wide variety of different factors. As discussed in further detail below, the route 202 may be based upon the road quality data.

In some embodiments, the remote computing system 150 may determine a projected quantification of damage to the autonomous vehicle 102 if and when the autonomous vehicle 102 traverses the segment 206 of the road 204 associated with poor road quality data. The projected quantification of damage to the autonomous vehicle 102 may be determined using the historical road quality data in the virtual map, historical maintenance data for autonomous vehicles 102 that have driven over the segment 206 of the road 204 associated with poor road quality data, a speed at which the autonomous vehicle 102 may traverse the segment 206 of the road 204 associated with poor road quality data, a total weight of the autonomous vehicle 102 and the objects and passengers within the autonomous vehicle 102, etc. In some embodiments, a machine learning model may be trained using the historical road quality data, the speed at which the autonomous vehicle 102 may traverse the segment 206 of road 204, and the historical maintenance data of the autonomous vehicles 102 to determine and/or calculate the projected quantification of damage to the autonomous vehicle 102.

In some embodiments, the remote computing system 150 may also compare the projected quantification of damage is compared to an amount of time needed to avoid the segment 206 of road 204 that is associated with poor road quality data. For example, the remote computing system 150 may quantify the amount of time to determine whether the projected quantification of damage exceeds the quantification of the amount of time needed to avoid the segment 206 of road 204. When the projected quantification of damage exceeds the quantification of the amount of time needed to avoid the segment 206 of road 204, the remote computing system 150 may then determine to generate the route 202 to proceed along the second road 208 to avoid the segment 206 of road 204 associated with poor road quality data.

In some embodiments, the remote computing system 150 may also present an option to the passenger of the autonomous vehicle 102. More specifically, the remote computing system 150 may determine at least two routes between the start location and the destination. A first route of the at least two routes may be a smoother route that may avoid the segment 206 of the road 204 associated with poor road quality data. A second route of the at least two routes may be a quicker route that may include the segment 206 of the road 204 associated with poor road quality data. The remote computing system 150 may then present the option to the passenger of the autonomous vehicle 102 between the smoother route and the quicker route. In some embodiments, the remote computing system 150 may determine the passenger's choice through preference data in a profile of the passenger in the ridesharing application 170. In other words, the routing may be determined in response to the preference of the user. In some embodiments, the internal computing system of the autonomous vehicle 102 may present the options to the passenger and/or determine which option the passenger selects and/or the preferences of the option. Thus, the internal computing system 110 may then request the selected route from the remote computing system 150 in accordance with the selection or preference of the passenger.

At step 320, the remote computing system 150 generates the plurality of waypoints 210 along the route 202. The plurality of waypoints 210 are locations that the autonomous vehicle 102 must advance to in a specified order to arrive at the final destination. The remote computing system 150 then sends the plurality of waypoints 210 to the autonomous vehicle 102. The internal computing system 110 of the autonomous vehicle 102 may be configured to receive the plurality of waypoints 210 along the route 202. Again, the route 202 may avoid the segment 206 or portion of road 204 for which the road quality data indicates a poor road quality for the segment 206 or portion of road 204.

At step 325, the autonomous vehicle 102 navigates to the plurality of waypoints 210 in the specified order. In some embodiments, the sensor systems 104-106 of the autonomous vehicle 102 may be configured to continue receiving additional road quality data and other related data. Similarly, the internal computing system 110 and the communication service 116 may be configured to continuously send the additional road quality data and other related data to the remote computing system 150.

At step 330, the autonomous vehicle 102 arrives at the destination. In some embodiments, the autonomous vehicle 102 may send data of current statuses of the various systems onboard to the remote computing system. For example, the autonomous vehicle 102 may determine a current tire pressure of tires installed on the autonomous vehicle 102 and send the information to the remote computing system 150. The remote computing system 150 may then determine changes between the current statuses of the autonomous vehicle 102 and a past status of the autonomous vehicle 102 before the trip. For example, the remote computing system 150 may then determine that the tires are severely underinflated compared to prior to the trip. In some embodiments, the remote computing system 150 may then generate a report or log file to further train various machine learning algorithms based upon the changes in statuses or damage to the autonomous vehicle 102 and the specific roads the autonomous vehicle 102 traversed. For example, when the tires are severely underinflated after the trip, the remote computing system 150 may determine that the roads that the autonomous vehicle 102 traversed may have poor road quality and accordingly create road quality flags for the roads.

Figure 4:
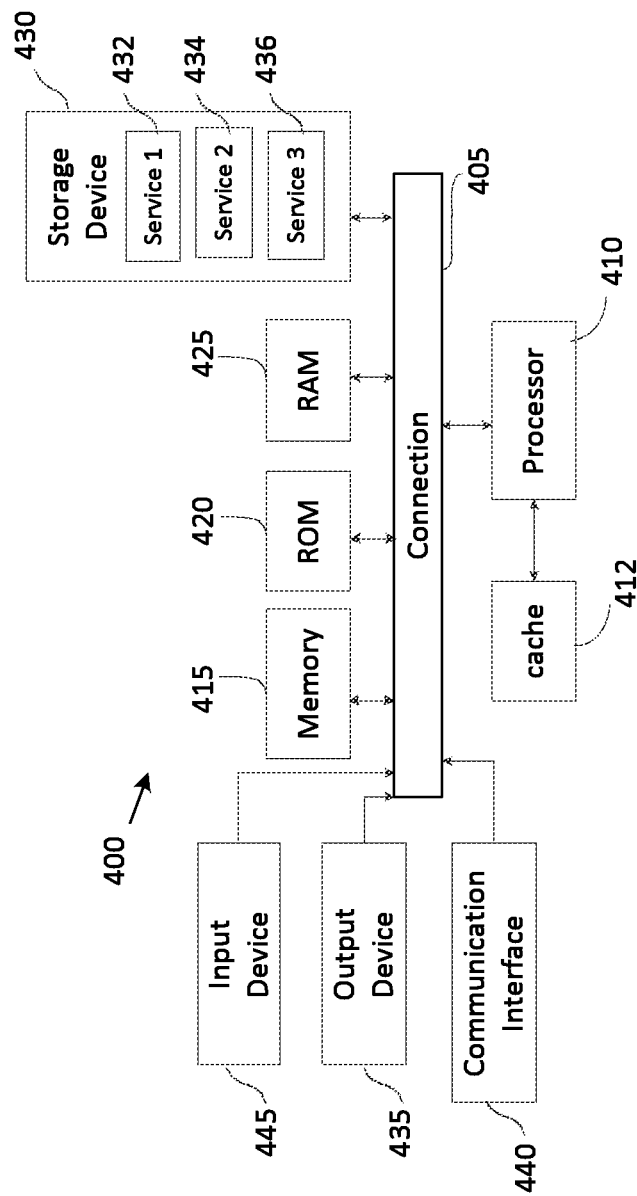
FIG. 4 shows an example of a system for implementing certain aspects of the present technology.

FIG. 4 shows an example of computing system 400, which can be for example any computing device making up internal computing system 110, remote computing system 150, (potential) passenger device executing rideshare app 170, or any component thereof in which the components of the system are in communication with each other using connection 405. Connection 405 can be a physical connection via a bus, or a direct connection into processor 410, such as in a chipset architecture. Connection 405 can also be a virtual connection, networked connection, or logical connection.

In some embodiments, computing system 400 is a distributed system in which the functions described in this disclosure can be distributed within a datacenter, multiple data centers, a peer network, etc. In some embodiments, one or more of the described system components represents many such components each performing some or all of the function for which the component is described. In some embodiments, the components can be physical or virtual devices.

Example system 400 includes at least one processing unit (CPU or processor) 410 and connection 405 that couples various system components including system memory 415, such as read-only memory (ROM) 420 and random access memory (RAM) 425 to processor 410. Computing system 400 can include a cache of high-speed memory 412 connected directly with, in close proximity to, or integrated as part of processor 410.

Processor 410 can include any general purpose processor and a hardware service or software service, such as services 432, 434, and 436 stored in storage device 430, configured to control processor 410 as well as a special-purpose processor where software instructions are incorporated into the actual processor design. Processor 410 may essentially be a completely self-contained computing system, containing multiple cores or processors, a bus, memory controller, cache, etc. A multi-core processor may be symmetric or asymmetric.

To enable user interaction, computing system 400 includes an input device 445, which can represent any number of input mechanisms, such as a microphone for speech, a touch-sensitive screen for gesture or graphical input, keyboard, mouse, motion input, speech, etc. Computing system 400 can also include output device 435, which can be one or more of a number of output mechanisms known to those of skill in the art. In some instances, multimodal systems can enable a user to provide multiple types of input/output to communicate with computing system 400. Computing system 400 can include communications interface 440, which can generally govern and manage the user input and system output. There is no restriction on operating on any particular hardware arrangement, and therefore the basic features here may easily be substituted for improved hardware or firmware arrangements as they are developed.

Storage device 430 can be a non-volatile memory device and can be a hard disk or other types of computer readable media which can store data that are accessible by a computer, such as magnetic cassettes, flash memory cards, solid state memory devices, digital versatile disks, cartridges, random access memories (RAMs), read-only memory (ROM), and/or some combination of these devices.

The storage device 430 can include software services, servers, services, etc., that when the code that defines such software is executed by the processor 410, it causes the system to perform a function. In some embodiments, a hardware service that performs a particular function can include the software component stored in a computer-readable medium in connection with the necessary hardware components, such as processor 410, connection 405, output device 435, etc., to carry out the function.

For clarity of explanation, in some instances, the present technology may be presented as including individual functional blocks including functional blocks comprising devices, device components, steps or routines in a method embodied in software, or combinations of hardware and software.

Any of the steps, operations, functions, or processes described herein may be performed or implemented by a combination of hardware and software services or services, alone or in combination with other devices. In some embodiments, a service can be software that resides in memory of a client device and/or one or more servers of a content management system and perform one or more functions when a processor executes the software associated with the service. In some embodiments, a service is a program or a collection of programs that carry out a specific function. In some embodiments, a service can be considered a server. The memory can be a non-transitory computer-readable medium.

In some embodiments, the computer-readable storage devices, mediums, and memories can include a cable or wireless signal containing a bit stream and the like. However, when mentioned, non-transitory computer-readable storage media expressly exclude media such as energy, carrier signals, electromagnetic waves, and signals per se.

Methods according to the above-described examples can be implemented using computer-executable instructions that are stored or otherwise available from computer-readable media. Such instructions can comprise, for example, instructions and data which cause or otherwise configure a general purpose computer, special purpose computer, or special purpose processing device to perform a certain function or group of functions. Portions of computer resources used can be accessible over a network. The executable computer instructions may be, for example, binaries, intermediate format instructions such as assembly language, firmware, or source code. Examples of computer-readable media that may be used to store instructions, information used, and/or information created during methods according to described examples include magnetic or optical disks, solid-state memory devices, flash memory, USB devices provided with non-volatile memory, networked storage devices, and so on.

Devices implementing methods according to these disclosures can comprise hardware, firmware and/or software, and can take any of a variety of form factors. Typical examples of such form factors include servers, laptops, smartphones, small form factor personal computers, personal digital assistants, and so on. The functionality described herein also can be embodied in peripherals or add-in cards. Such functionality can also be implemented on a circuit board among different chips or different processes executing in a single device, by way of further example.

The instructions, media for conveying such instructions, computing resources for executing them, and other structures for supporting such computing resources are means for providing the functions described in these disclosures.

Although a variety of examples and other information was used to explain aspects within the scope of the appended claims, no limitation of the claims should be implied based on particular features or arrangements in such examples, as one of ordinary skill would be able to use these examples to derive a wide variety of implementations. Further and although some subject matter may have been described in language specific to examples of structural features and/or method steps, it is to be understood that the subject matter defined in the appended claims is not necessarily limited to these described features or acts. For example, such functionality can be distributed differently or performed in components other than those identified herein. Rather, the described features and steps are disclosed as examples of components of systems and methods within the scope of the appended claims.

What is claimed is:

1. An autonomous vehicle comprising:
    a communication system configured to communicate with a remote computing device;
    at least one sensor configured to detect autonomous vehicle movements and orientation; and
    an internal computing system configured to receive outputs from the at least one sensor, determine road quality data based on the outputs from the at least one sensor, and determine a route for the autonomous vehicle that avoids a segment of a road that is associated with poor road quality data,
    wherein the determination of the route is based on a projected quantification of damage to the autonomous vehicle traversing the segment of the road associated with the poor road quality data, the projected quantification of the damage calculated by a processor that accesses, via the communication system, historical road quality data and historical maintenance data stored in the remote computing device to determine the projected quantification of the damage; and
    wherein the internal computing system is further configured to be in communication with the communication system to send the road quality data to the remote computing device.

2. The autonomous vehicle of claim 1, wherein the at least one sensor includes a suspension sensor configured to monitor roll, pitch, and yaw of the autonomous vehicle while the autonomous vehicle travels along the road.

3. The autonomous vehicle of claim 1, wherein the communication system is further configured to communicate with a second autonomous vehicle.

4. The autonomous vehicle of claim 1, wherein the internal computing system is configured to receive a plurality of waypoints along the route, wherein the route avoids a portion of the road for which the road quality data indicates a poor road quality for the portion of the road.

5. The autonomous vehicle of claim 1, wherein the internal computing system creates and sends a road quality flag to the remote computing device, the road quality flag associated with the road quality data to correspond to a segment of a virtual map.

6. The autonomous vehicle of claim 1, wherein the internal computing system, in response to a preference of a user, requests a route in accordance with the preference of the user.

7. The autonomous vehicle of claim 1, wherein the internal computing system is configured to present an option to a passenger of the autonomous vehicle whether the passenger prefers a quicker route or a smoother route, wherein the quicker route is shorter and includes the segment of the road that is associated with the poor road quality data and the smoother route is longer and avoids the segment of the road that is associated with the poor road quality data.

8. A non-transitory computer readable medium comprising instructions stored thereon that when executed by at least one processor cause the at least one processor to:
    receive road quality data from at least one vehicle in a fleet of vehicles, wherein the road quality data is gathered at least one sensor on the at least one vehicle configured to detect vehicle movements and orientation;
    calculate a projected quantification of damage to the at least one vehicle traversing a segment of a road associated with poor road quality data based on historical road quality data and historical maintenance data stored in a remote computing device; and
    determine a route for the at least one vehicle in the fleet of vehicles that avoids the segment of the road that is associated with the poor road quality data based on the projected quantification of the damage to the at least one vehicle.

9. The non-transitory computer readable medium of claim 8, wherein the instructions cause the at least one processor to:
create a road quality flag for a segment of a virtual map that corresponds to the segment of the road that is associated with the poor road quality data.

10. The non-transitory computer readable medium of claim 8, wherein the determination of the route for the at least one vehicle includes determining at least two routes between a start and a destination, wherein a first one of the at least two routes avoids the segment of the road that is associated with the poor road quality data but is longer, and a second one of the at least two routes includes the segment of the road that is associated with the poor road quality data, but is quicker, the instructions further cause the at least one processor to:
present an option to a passenger of the at least one vehicle whether they prefer the first one of the at least two routes that avoids the segment of the road associated with the poor road quality data or the second one of the at least two routes that is quicker.

11. The non-transitory computer readable medium of claim 8, wherein the road quality data includes changes to a suspension sensor of the autonomous vehicle configured to monitor roll, pitch, and yaw of the autonomous vehicle while the autonomous vehicle travels along the road.

12. The non-transitory computer readable medium of claim 8, wherein the instructions cause the at least one processor to:
compare an intensity of damage to a vehicle caused by the vehicle navigating over the segment of the road that is associated with the poor road quality data to an amount of time needed to avoid the segment of the road that is associated with the poor road quality data.

13. A method comprising:
receiving road quality data from at least one vehicle in a fleet of vehicles, wherein the road quality data is gathered at least one sensor on the at least one vehicle configured to detect vehicle movements and orientation;
calculating a projected quantification of damage to the at least one vehicle traversing a segment of a road associated with poor road quality data based on historical road quality data and historical maintenance data stored in a remote computing device; and
determining a route for the at least one vehicle that avoids the segment of the road that is associated with the poor road quality data based on the projected quantification of the damage to the at least one vehicle.

14. The method of claim 13, further comprising monitoring roll, pitch, and yaw of the at least one vehicle while the at least one vehicle travels along the roads via suspension sensors.

15. The method of claim 13, create a road quality flag for a segment of a virtual map that corresponds to the segment of the road that is associated with the poor road quality data.

16. The method of claim 13, further comprising:
presenting an option to a passenger of the at least one vehicle whether the passenger prefers a quicker route or a smoother route,
wherein the determination of the route for the at least one vehicle includes determining at least two routes between a start and a destination,
wherein the quicker route of the at least two routes includes the segment of the road that is associated with the poor road quality data but is quicker and the smoother route of the at least two routes avoids the segment of the road that is associated with the poor road quality data but is longer.

17. The method of claim 13, further comprising:
comparing an intensity of damage to the at least one vehicle caused by the at least one vehicle navigating over the segment of the road that is associated with the poor road quality data to an amount of time needed to avoid the segment of the road that is associated with the poor road quality data.

18. The method of claim 13, further comprising:
generating a log file including damage to the at least one vehicle when traversing the road.

* * * * *